United States Patent [19]
Ikemori et al.

[11] Patent Number: 4,775,228
[45] Date of Patent: Oct. 4, 1988

[54] ZOOM LENS

[75] Inventors: Keiji Ikemori; Takashi Matsushita, both of Kanagawa, Japan

[73] Assignee: Canon Kabushiki Kaisha, Japan

[21] Appl. No.: 785,455

[22] Filed: Oct. 8, 1985

[30] Foreign Application Priority Data

Oct. 11, 1984 [JP] Japan .................................. 59-212923

[51] Int. Cl.$^4$ .......................... G02B 15/22; G02B 9/64
[52] U.S. Cl. .................................................... 350/426
[58] Field of Search ................................. 350/426, 427

[56] References Cited

U.S. PATENT DOCUMENTS 3,707,324 12/1972 Macher ................................. 350/427

Primary Examiner—John K. Corbin
Assistant Examiner—Rebecca D. Gass
Attorney, Agent, or Firm—Toren, McGeady & Associates

[57] ABSTRACT

A zoom lens whose first lens group, counting from front, has a negative refractive power and moves axially in differential relation to a following lens group to effect zooming, wherein the first lens group is constructed with a lens unit of negative power followed by another lens unit of positive power, whereby for focusing purposes, the negative lens unit is axially moved, while the positive lens unit is held stationary, to improve the stabilization of aberration correction throughout the entire focusing range.

14 Claims, 10 Drawing Sheets

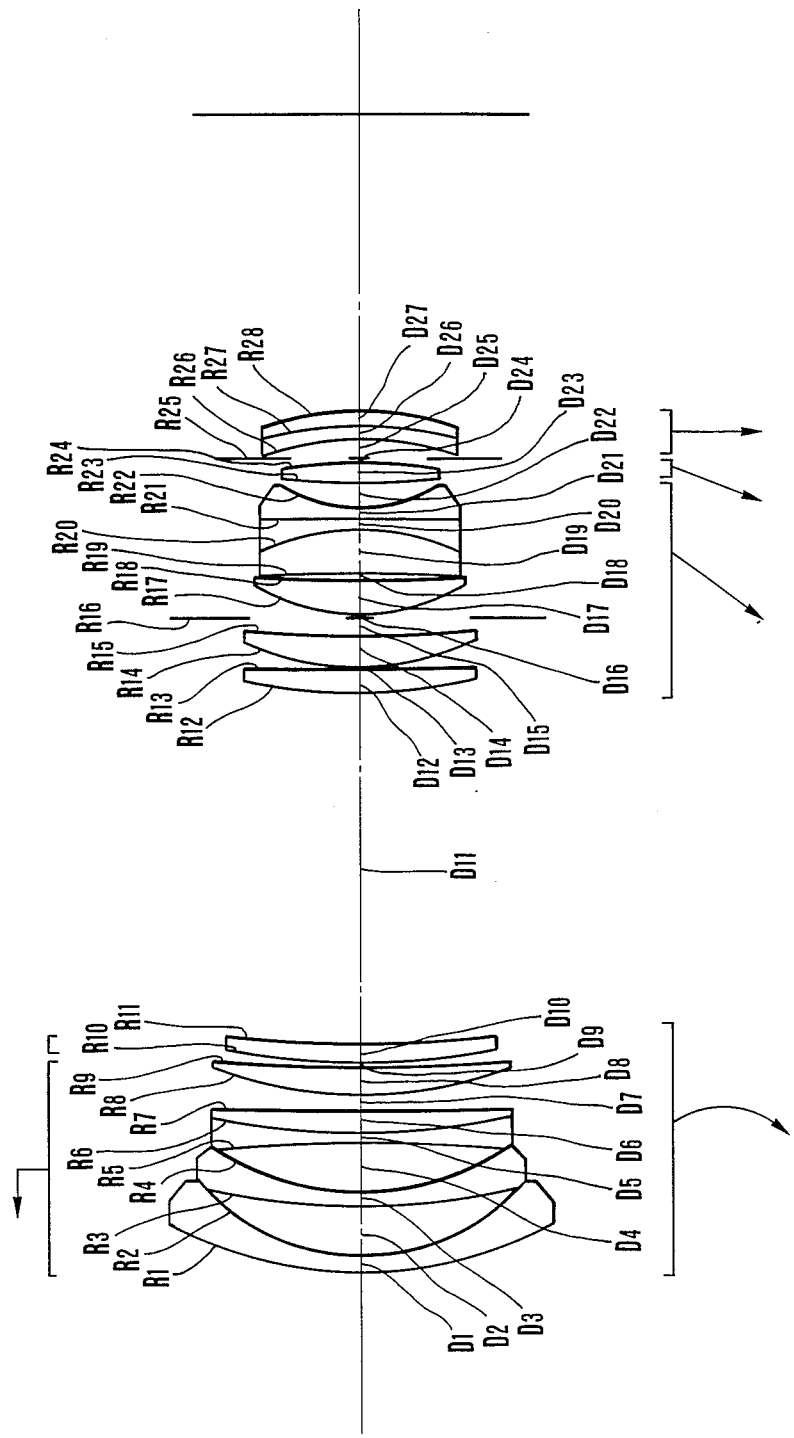

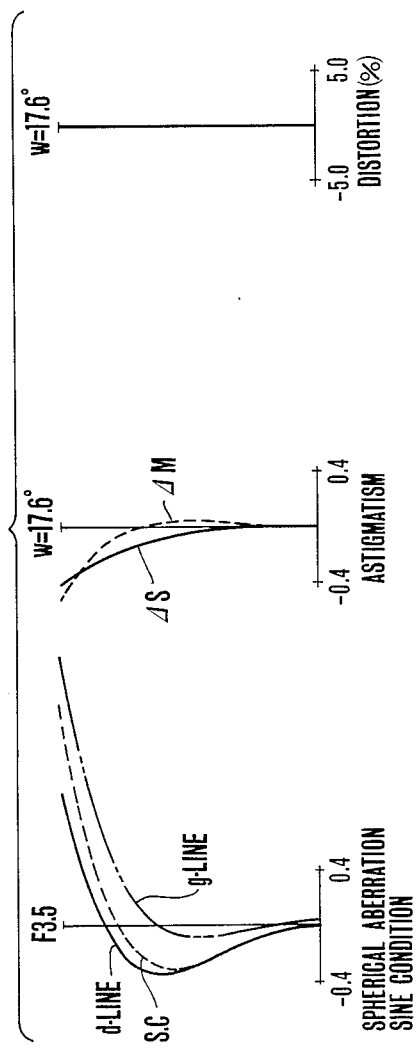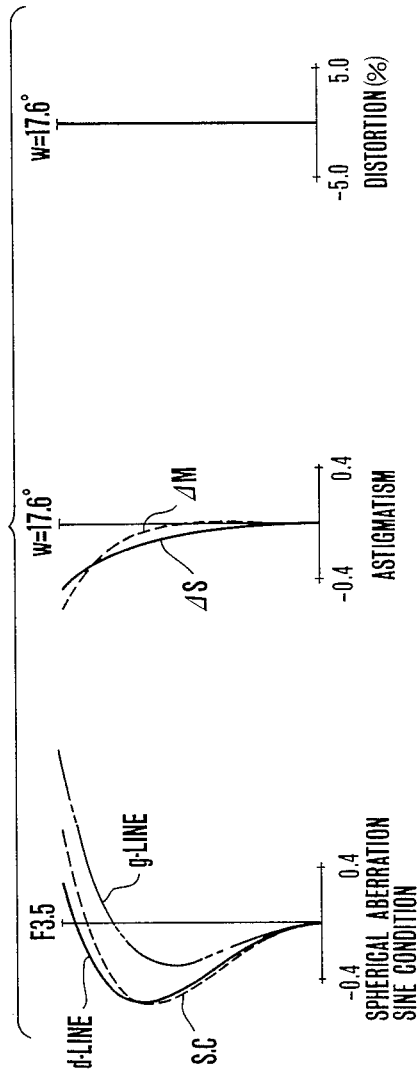

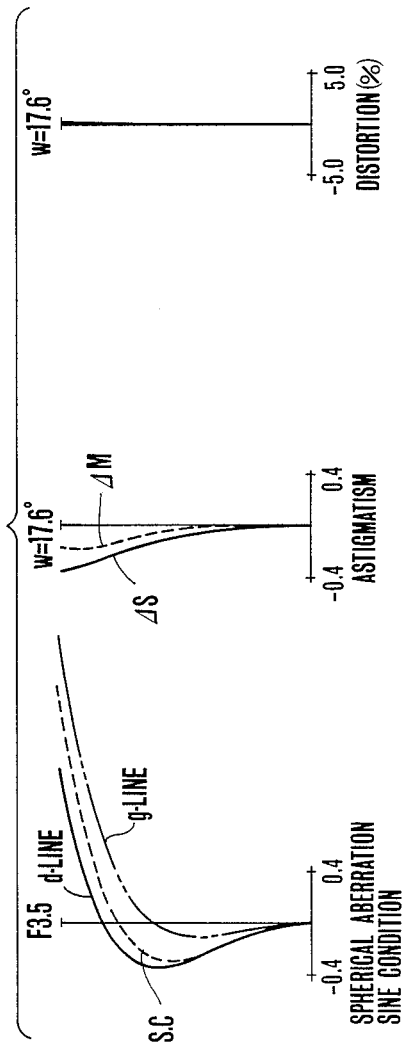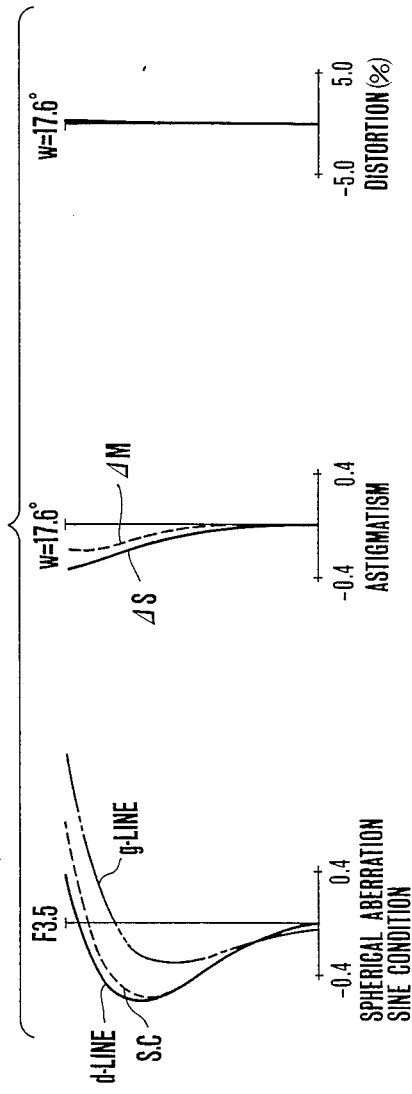

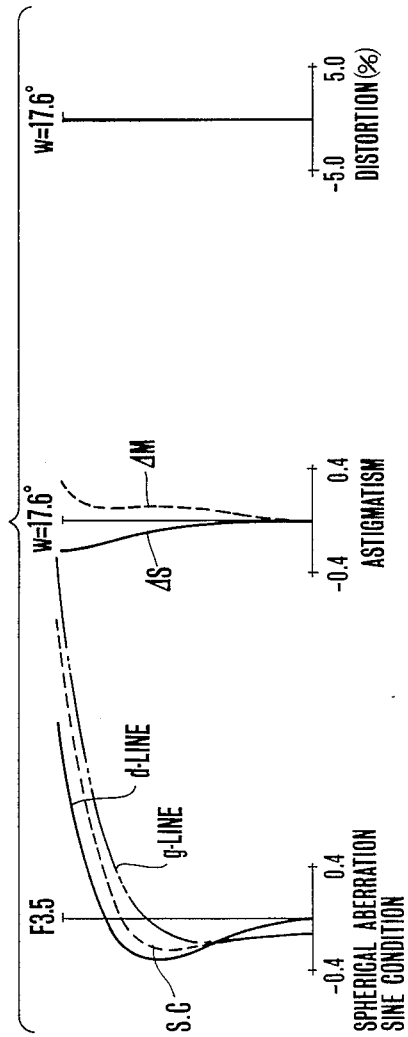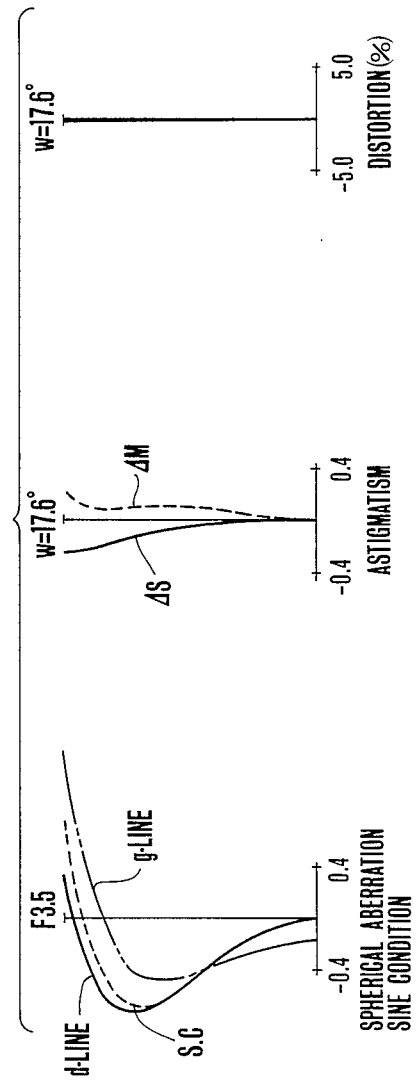

ZOOM LENS

BACKGROUND OF THE INVENTION

1. Field of the Invention

This invention relates to the focusing of zoom lenses, and more particularly to a lens design for improving the stabilization of aberration correction when the zoom lens, beginning with a lens group of negative refractive power is being focused.

2. Description of the Prior Art

In the past, a wide variety of zoom lenses, beginning with a component of negative refractive power and, in particular, with the inclusion of another component of positive refractive power on the image side of the former, so that these two components are made axially move in differential relation to effect zooming, have been designed, but most of these zoom lenses have the focusing provision at all the elements of the negative component.

By the recent trend of minimizing the bulk and size of this type lens system, the refractive powers of such two, or negative and positive, components are both caused to increase. For a further advance in compactness, an additional component of negative power is apt to be used and is arranged in rear of the positive component and remains stationary during zooming.

And, in this case also, the negative and positive components movable for zooming are given further stronger refractive powers.

With respect to focusing, such an increase in the refractive power of the front negative component has great advantages in that the total focusing movement, whose terminal ends correspond to infinite and minimum object distances, is reduced and that it can contribute to an improvement in the compactness of the lens system as a whole, but leads to a prominent variation with focusing of aberrations, particularly when in telephoto positions and thereabout. This is intensified as the relative aperture increases, the focal length increases and the minimum object distance shortens, resulting in deterioration of aberrations, particularly spherical aberration (over-corrected near or at the minimum object distance), which have been very difficult to correct.

Meanwhile, in the art of fixed focal length lenses, to maintain some of the aberrations stable throughout the focusing range, a focusing method of bodily moving the lens while simultaneously varying one or two lens separation or separations has been put into practice as is known in U.S. Pat. No. 3,748,021, for example. If this method is applied to zoom lenses not in an appropriate way, however, a large increase in the necessary number of lens elements is called for, and the operating mechanism is made complicated in structure.

SUMMARY OF THE INVENTION

An object of the present invention is to provide a zoom lens having a negative refractive power at the front with means making it possible to eliminate the problem arising when this type of zoom lens is focused, and further to provide a focusing arrangement which does not expert stress on the operating mechanism.

Another object of the invention is to provide a zoom lens whose first lens group counting from front, has a negative refractive power, whereby the first lens group is divided into a lens unit of negative refractive power followed by another lens unit of positive refractive power, so that when focusing, the negative lens unit is axially moved, while the positive lens unit remains stationary. Thus, one lens separation is varied to achieve good stability of aberration correction throughout the focusing range.

BRIEF DESCRIPTION OF THE DRAWINGS

FIG. 4 is a longitudinal section view of an example 1 of a specific zoom lens of the invention.

FIGS. 5A to 5C and 6A and 6B are graphic sentations of the abberrations of the lens of FIG. 4.

FIGS. 8A to 8C, and 9A and 9B are graphic representations of the aberrations of the lens of FIG. 7.

FIGS. 11A to 11C, and 12A and 12B are graphic representations of the aberrations of the lens of FIG. 10.

DETAILED DESCRIPTION OF THE PREFERRED EMBODIMENTS

What problem is produced about the aberrations in the image and how to solve it are first described below.

Figure 1:
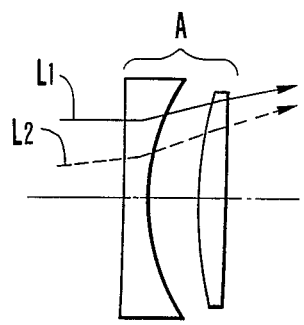
FIG. 1 is a diagram illustrating a change of the path of a ray with focusing in the prior art.
Figure 3:
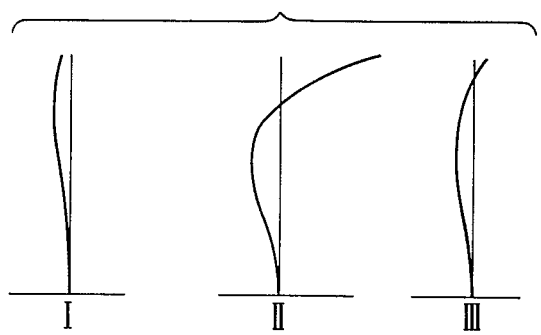
FIG. 3 shows graphs of aberration curves for explaining how the spherical aberration tends to change.

In FIG. 1 there is shown a behavior of a ray passing through the first lens group of negative refractive power when axially moved to effect focusing. Though the first lens group A is schematically shown as comprising negative and positive lenses, for the front or negative lens actually bears the power of the lens group, it usually consists of two or more negative meniscus lenses. The rear or positive lens is used with the aim at aberration correction as is known in the art. Now assuming that when focusing is performed by bodily moving the first lens group A, a paraxial ray L2 from an object at the minimum distance emerges with a larger angle than when the object lies at infinity with a paraxial ray L1. This angle of emergence is inversely proportional to the object distance. Because the overall refractive power of the first lens group A is negative, as the angle of emergence increases, the spherical aberration is over-corrected. In FIG. 3, curve II represents this behavior.

Figure 2:
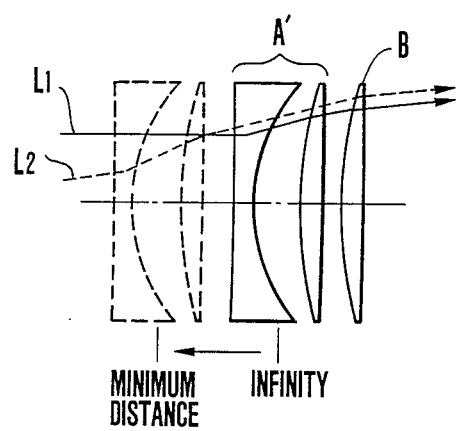
FIG. 2 is similar to FIG. 1 except that the present invention is illustrated.

On this account, a lens unit B of positive power may be added and held stationary during focusing, as shown in FIG. 2. Focusing is performed by moving the lens group A' of negative power, while the lens unit B of positive power remains stationary. Then, although the angle of emergence from the lens group A' increases with decrease in the object distance as has been stated above, it is for now that the ray with that increased angle of emergence comes on the lens unit B. Because the refractive power of this lens unit B is positive, as the angle of incidence increases, the spherical aberration is under-corrected. And, as the axial separation between the lens group A' and the lens unit B increases, the lens unit B produces a larger amount of spherical aberration under-corrected. Therefore, if focusing is otherwise performed by moving both of the lens group A' and unit B with a constant separation therebetween, the over-corrected spherical aberration of the lens group A' is always larger than the under-corrected one. By making the lens unit B stationary so that the lens group A' only is made movable for focusing purposes as in the present invention, it becomes possible to take a balance between the over-corrected and under-corrected spherical aberration produced from the lens group A' and the lens unit B, respectively. As shown in FIG. 3, the spherical aberration I for the infinitely distance object and the spherical aberration III for the object at the minimum distance can be obtained.

By the above-described focusing arrangement, the objects of the invention can be accomplished. However, reduce the necessary number of lens elements while preserving good image quality, it is desirable to consider the following condition:

$$0.01 < |F1/fb| < 0.2$$

where F1 is the focal length of the first lens group, and fb is the focal length of the positive lens unit. This condition is set forth for spherical aberration is corrected in good balance throughout the entire focusing range. When below the lower limit, over-correction results for shorter object distances. When above the upper limit, under-corrected spherical aberration is conversely produced. Thus the spherical aberration is not stabilized. And, an increase in the relative aperture is further considered when to determine the power distribution, it might be better to narrow the range to $0.02 < |F1/fb| < 0.1$.

Also as for the lens form, it is preferred to arrange a positive meniscus lens of forward convexity at the rearmost position in the lens group A' so that the air lens defined by its front surface and the rear surface of the lens just in front thereof which is concave toward the rear is given a converging action to correct the over-corrected spherical aberration of the lens group A' as much as possible.

It should be noted that under the above-stated condition, the first lens group, lens group A', and lens unit B have their focal lengths F1, fa and fb in a relationship: $1/fb < |1/F1| < |1/fa|$. In other words, the refractive power of the lens group A' for focusing becomes strongest, and the refractive power of the lens unit B becomes weakest, thereby the total focusing movement is reduced and the number of lens elements is reduced. Thus a compact form is possible to realize.

Next, specific embodiments of the invention are described. The zoom lens to which the invention is applied has the basic configuration that a first lens group, counting from front, is of negative refractive power, and a second lens group of positive refractive power, and is of the type in which the first and second lens groups are moved axially at the same time and independently of each other to effect zooming. Its dimensions are: the focal length ranging from 29 to 68, F-number from 1/2.9 to 1/3.5, and the image angle 36.7° to 17.6°.

Also, Ri is the radius of curvature of the i-th surface counting from the front, Di is the i-th separation between the surfaces counting from the front, and Ni and $\nu$i are the refractive index and Abbe number of the glass of the i-th lens element counting from the front, respectively. Also, Ai, Bi, Ci, Di and Ei are the aspherical coefficients of the i-th surface counting from the front. The aspherical coefficients are defined as follows:

The axial distance $\bar{x}$ from the reference spherical surface at a height H from the optical axis with the radius of curvature of the reference spherical surface being denoted by $\bar{r}$ is:

$$\bar{x} = \bar{r}\left(1 - \left(1 - \left(1 - \frac{(H - H^o)^2}{\bar{r}^2}\right)\right)\right)^{\frac{1}{2}} + A(H - H^o)^2 +$$

$$B(H - H^o)^4 + C(H - H^o)^6 + D(H - H^o)^8 +$$

$$E(H - H^o)^{10} \ldots \text{ where } H \geq H^o$$

$$= 0 \ldots \text{ where } H < H^o$$

Here H° represents the height of the boundary between the spherical and aspherical surfaces from the optical axis.

Numerical examples 1 and 2 are zoom lenses each comprising a negative first lens group, a positive second lens group and a positive third lens group. The second and third lens groups may be taken as one group. During zooming, the positive third lens group is held stationary. A movable stop in the space between the second and third lens groups, though not relating to the present invention, when made to move at different speeds from that of movement of the second lens group has an advantage of removing the harmful light during zooming. It should be noted that, the size of an aperture opening of the stop does not vary with variation of the focal length.

Another numerical example 3 is a zoom lens comprising a negative first lens group and a positive second lens group.

Figure 5A:
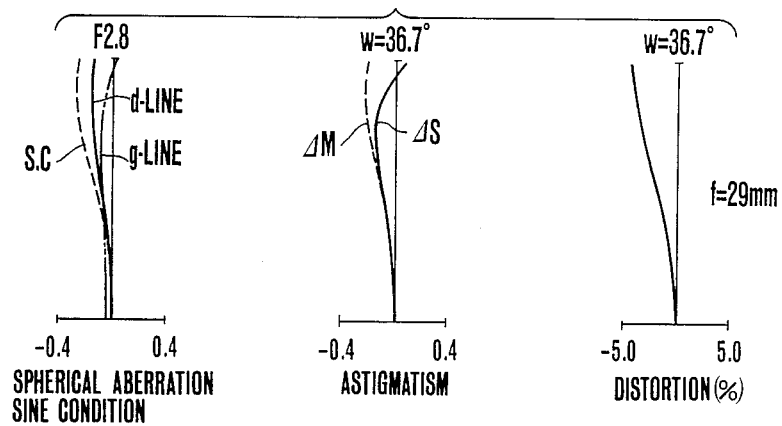
Figure 5B:
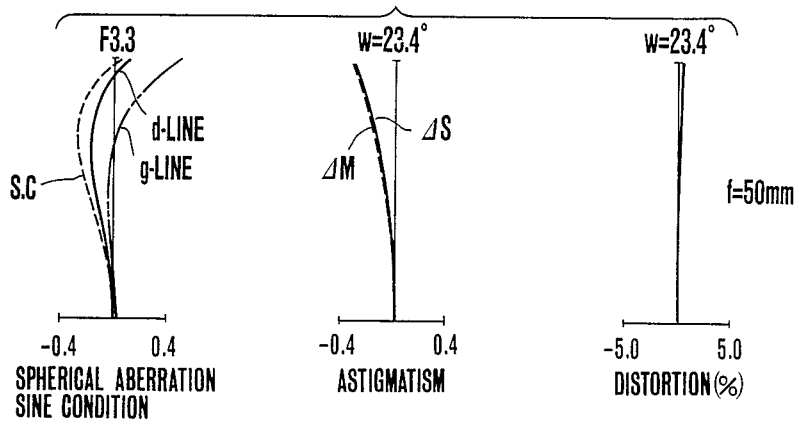
Figure 5C:
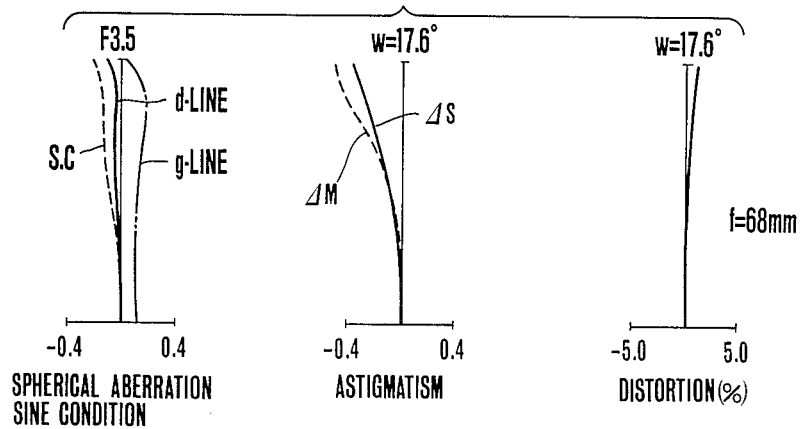
Figure 7:
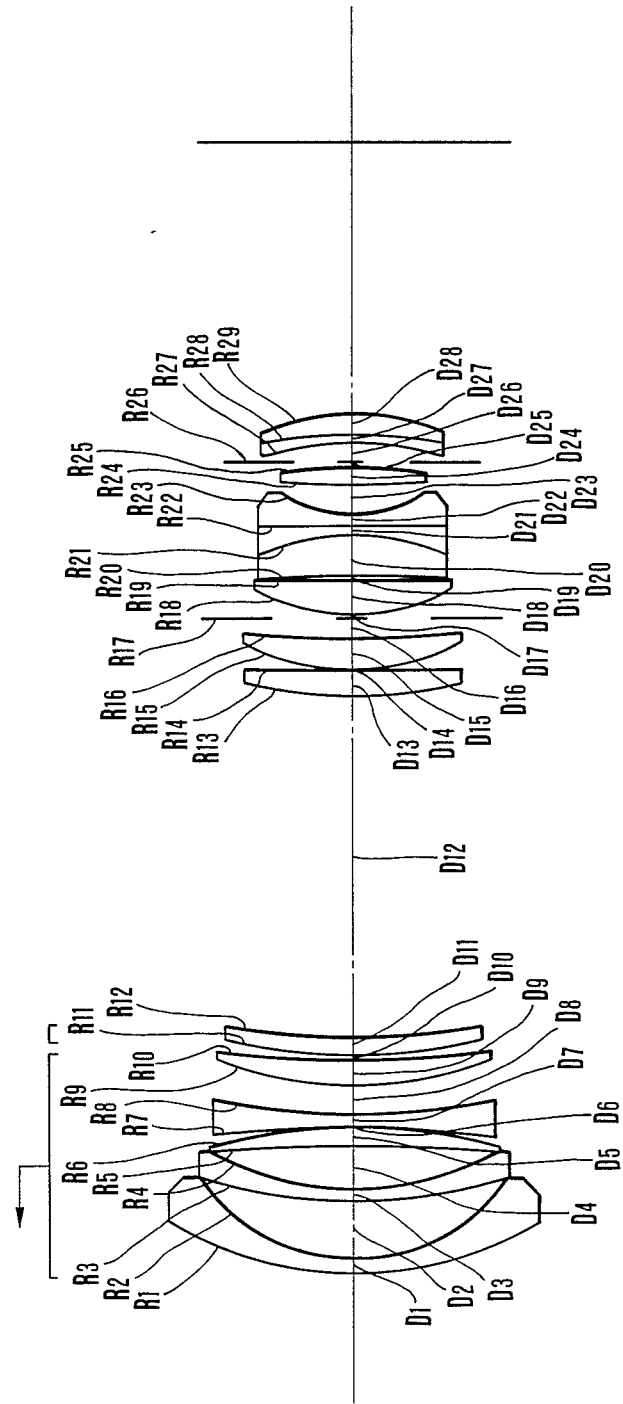
FIG. 7 is a longitudinal section view of another example 2 of a zoom lens of the invention.

In the numerical example 1, the various aberrations in the wide angle, middle and telephoto positions with an object at infinity are shown in FIGS. 5A to 5C, respectively. FIGS. 6A and 6B show the various aberrations when focused to a close object at 30 cm, with FIG. 6A corresponding to a case when the first lens group is moved as a whole to effect focusing, and FIG. 6B corresponding to another case when the last meniscus lens (R11, R12) is held stationary during focusing.

Figure 8A:
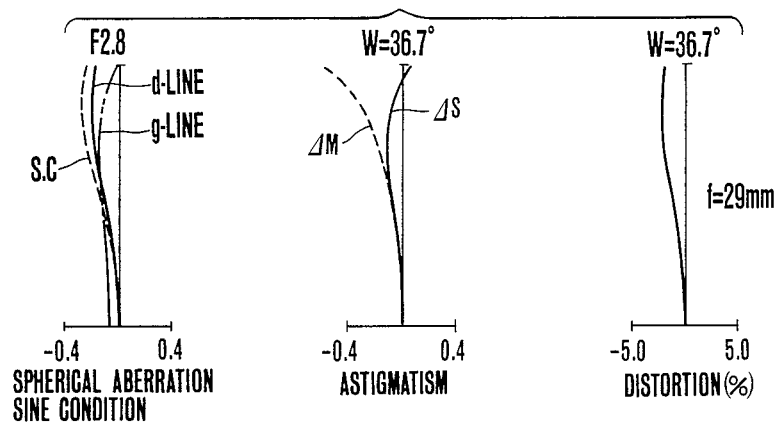
Figure 8B:
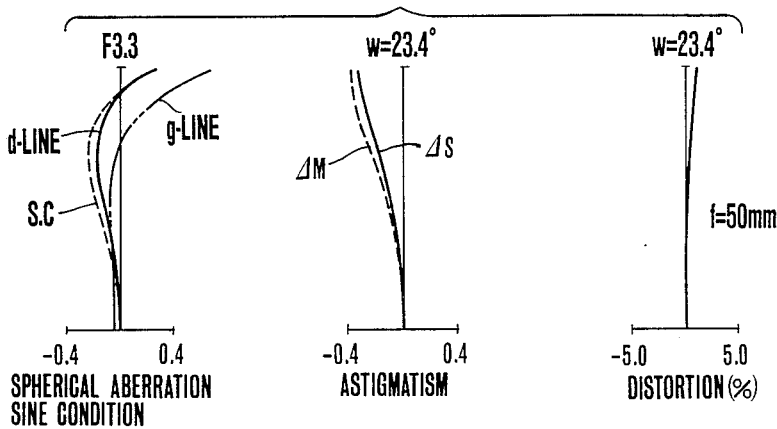
Figure 8C:
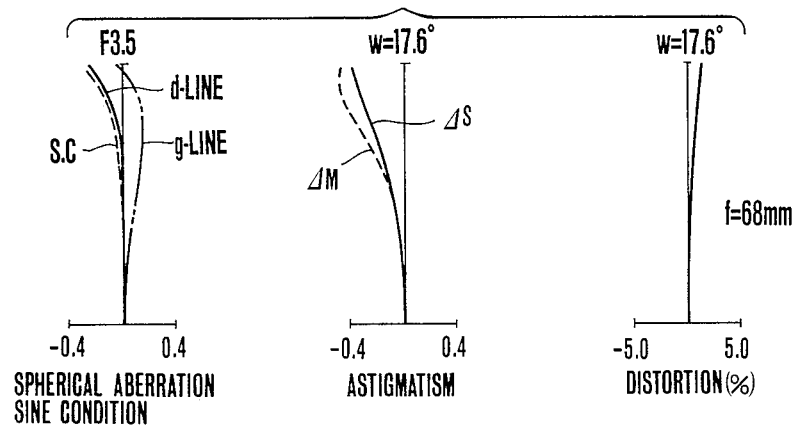
Figure 10:
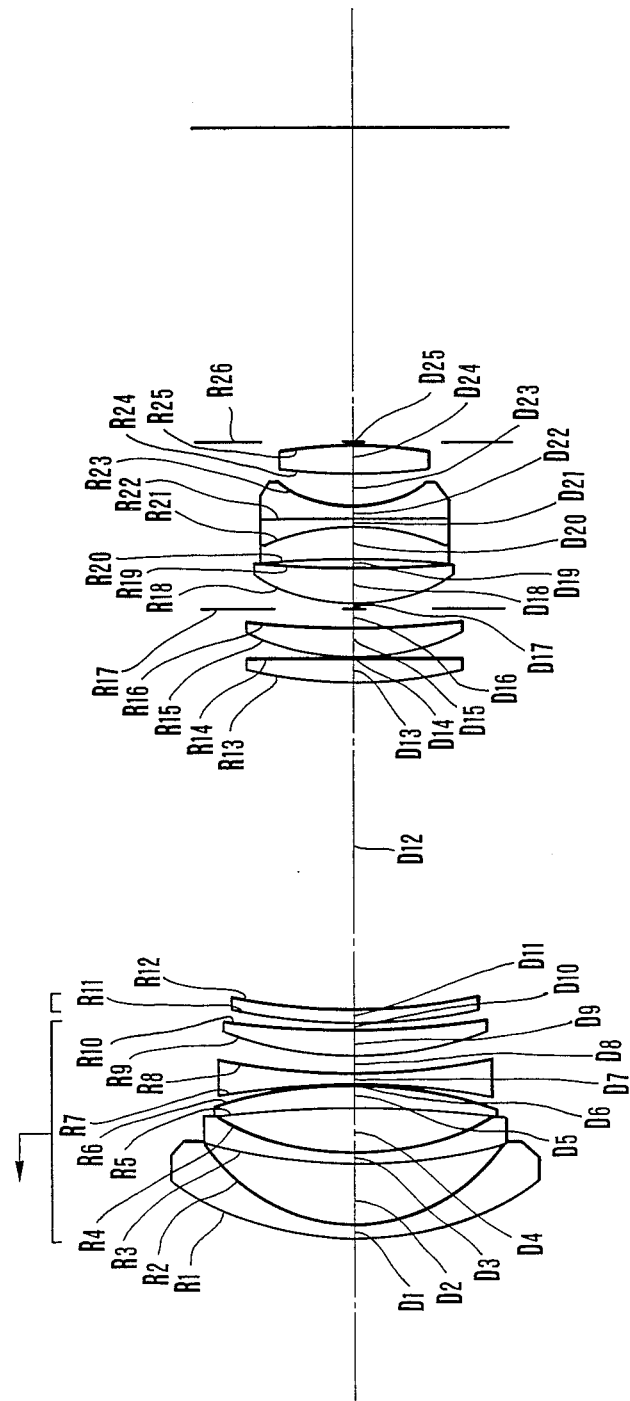
FIG. 10 is a longitudinal section view of still another example 3 of a specific zoom lens of the invention.

FIGS. 8A to 8C illustrate variations of the various aberrations of the numerical example 2 during zooming with an object at infinity. FIGS. 9A and 9B illustrate the difference in the various aberrations between the prior art, where the first lens group (R1–R12) is bodily moved and the present invention, respectively, when focused down to the same distance as above.

Figure 11A:
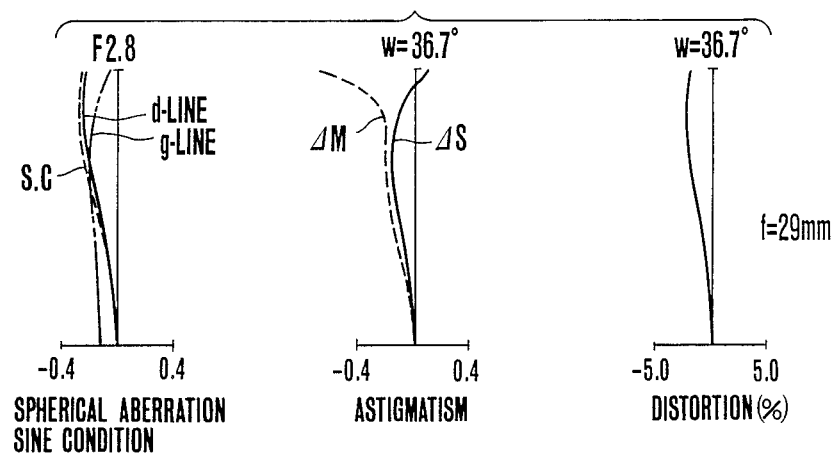
Figure 11B:
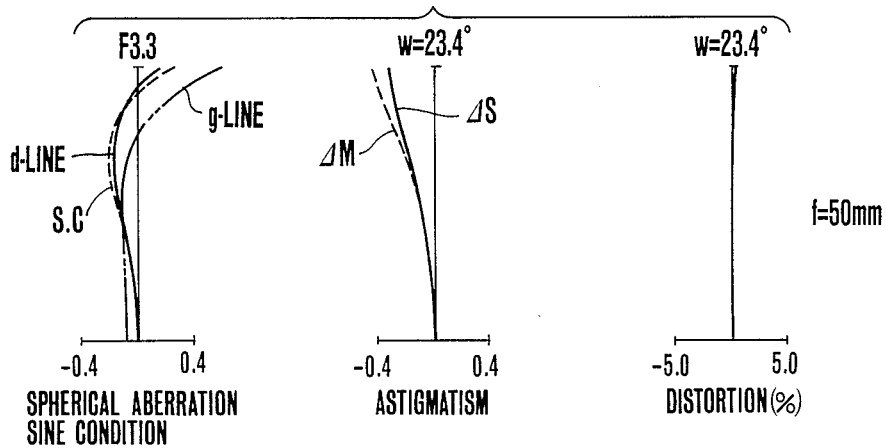
Figure 11C:
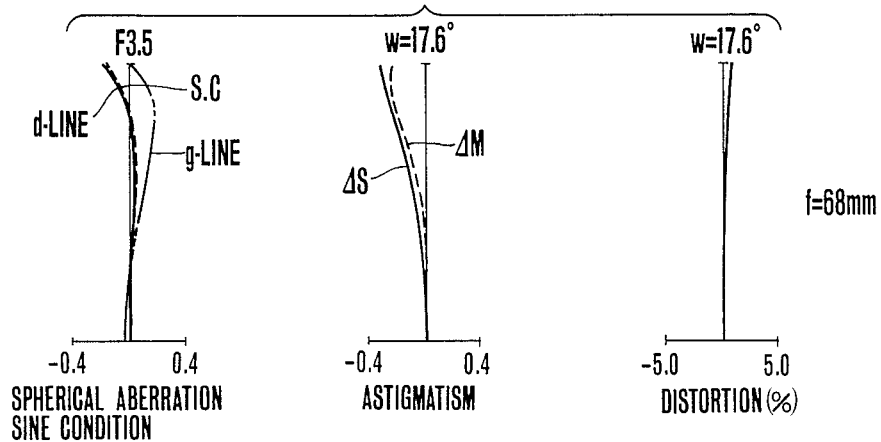

FIGS. 11A to 11C illustrate variation of the various aberrations of the numerical example 3 during zooming with an object at infinity. FIGS. 12A and 12B illustrate the difference in the various aberrations between when the first lens group (R1–R12) is bodily moved and when the present invention is applied, respectively, as focused down to the same object distance as above.

NUMERICAL EXAMPLE 1

| F = 29–68 (mm) FNO = 1:2.8–3.5 2ω = 73.4°–35.2° | | | |
| --- | --- | --- | --- |
| R1 = 47.197 | D1 = 2.20 | N1 = 1.76200 | $\nu$1 = 40.1 |
| R2 = 27.146 | D2 = 6.92 | | |
| R3 = 83.939 | D3 = 2.00 | N2 = 1.81600 | $\nu$2 = 46.6 |
| R4 = 34.227 | D4 = 6.58 | | |
| R5 = −155.372 | D5 = 1.60 | N3 = 1.88300 | $\nu$3 = 40.8 |

-continued

| | | | |
|---|---|---|---|
| R6 = 101.880 | D6 = 2.70 | N4 = 1.74950 | ν4 = 35.3 |
| R7 = 1034.171 | D7 = 1.96 | | |
| R8 = 53.715 | D8 = 3.98 | N5 = 1.80518 | ν5 = 25.4 |
| R9 = 294.100 | D9 = 0.80 (Variable) | | |
| R10 = 110.320 | D10 = 2.20 | N6 = 1.48749 | ν6 = 70.2 |
| R11 = 133.729 | D11 = Variable | | |
| R12 = 64.980 | D12 = 3.20 | N7 = 1.69680 | ν7 = 55.5 |
| R13 = −1171.820 | D13 = 0.15 | | |
| R14 = 33.745 | D14 = 4.20 | N8 = 1.54771 | ν8 = 62.9 |
| R15 = 150.490 | D15 = 2.44 | | |
| R16 = (Stop) | D16 = 0.40 | | |
| R17 = 26.906 | D17 = 4.66 | N9 = 1.57099 | ν9 = 50.8 |
| R18 = 254.612 | D18 = 0.70 | | |
| R19 = −288.928 | D19 = 5.70 | N10 = 1.84666 | ν10 = 23.9 |
| R20 = −29.528 | D20 = 1.39 | N11 = 1.80518 | ν11 = 25.4 |
| R21 = 318.196 | D21 = 1.50 | N12 = 1.84666 | ν12 = 23.9 |
| R22 = 18.397 | D22 = 3.43 | | |
| R23 = 86.196 | D23 = 2.77 | N13 = 1.63980 | ν13 = 34.5 |
| R24 = −53.077 | D24 = Variable | | |
| R25 = (Movable Stop) | D25 = Variable | | |
| R26 = −36.935 | D26 = 1.50 | N14 = 1.88300 | ν14 = 40.8 |
| R27 = −44.736 | D27 = 2.30 | N15 = 1.58144 | ν15 = 40.7 |
| R28 = −34.766 | | | |

| f | 29.0 | 50.0 | 68.0 |
|---|---|---|---|
| D11 | 47.57 | 13.17 | 0.60 |
| D24 | 0.29 | 12.29 | 10.91 |
| D25 | 2.65 | 5.95 | 20.45 |

Aspherical Coefficients
A1 = 0.0                           F1 = −55.50
B1 = 3.83460 × 10$^{-7}$           F2 = 41.60
C1 = −4.51042 × 10$^{-10}$         F3 = 2383.3
D1 = 1.94532 × 10$^{-12}$          fa = −52.47
E1 = −7.26398 × 10$^{-17}$         fb = 1254.2
H*1 = 3.0

NUMERICAL EXAMPLE 2

F = 29−68 (mm)  FNO = 1:2.8−3.5  2ω = 73.4°−35.2°

| | | | |
|---|---|---|---|
| R1 = −50.466 | D1 = 2.00 | N1 = 1.72000 | ν1 = 50.2 |
| R2 = 26.111 | D2 = 7.78 | | |
| R3 = 73.545 | D3 = 1.80 | N2 = 1.88300 | ν2 = 40.8 |
| R4 = 42.329 | D4 = 5.63 | | |
| R5 = −324.377 | D5 = 2.70 | N3 = 1.72342 | ν3 = 38.0 |
| R6 = −82.310 | D6 = 0.11 | | |
| R7 = −151.637 | D7 = 1.50 | N4 = 1.88300 | ν4 = 40.8 |
| R8 = 89.040 | D8 = 3.98 | | |
| R9 = 49.253 | D9 = 3.69 | N5 = 1.84666 | ν5 = 23.9 |
| R10 = 133.274 | D10 = 0.80 (Variable) | | |
| R11 = 78.260 | D11 = 2.20 | N6 = 1.48749 | ν6 = 70.2 |
| R12 = 88.063 | D12 = Variable | | |
| R13 = 68.204 | D13 = 3.20 | N7 = 1.69680 | ν7 = 55.5 |
| R14 = −3179.717 | D14 = 0.15 | | |
| R15 = 31.931 | D15 = 4.20 | N8 = 1.54771 | ν8 = 62.9 |
| R16 = 177.370 | D16 = 2.44 | | |
| R17 = (Stop) | D17 = 0.40 | | |
| R18 = 27.916 | D18 = 4.59 | N9 = 1.62374 | ν9 = 47.1 |
| R19 = 315.047 | D19 = 0.66 | | |
| R20 = −235.237 | D20 = 5.19 | N10 = 1.84666 | ν10 = 23.9 |
| R21 = −31.853 | D21 = 1.39 | N11 = 1.80518 | ν11 = 25.4 |
| R22 = 1912.412 | D22 = 1.50 | N12 = 1.84666 | ν12 = 23.9 |
| R23 = 18.122 | D23 = 3.83 | | |
| R24 = 103.512 | D24 = 2.69 | N13 = 1.64769 | ν13 = 33.8 |
| R25 = −52.484 | D25 = Variable | | |
| R26 = (Movable Stop) | D26 = Variable | | |
| R27 = −45.058 | D27 = 1.30 | N14 = 1.88300 | ν14 = 40.8 |
| R28 = −68.453 | D28 = 2.50 | N15 = 1.61293 | ν15 = 37.0 |
| R29 = −40.130 | | | |

| f | 29.0 | 50.0 | 68.0 |
|---|---|---|---|
| D12 | 47.56 | 13.16 | 0.59 |
| D25 | 0.30 | 11.31 | 14.92 |
| D26 | 2.65 | 6.95 | 16.45 |

Aspherical Coefficients
A1 = 0.0                  A25 = 0.0                    F1 = −55.50
B1 = 3.99342 × 10$^{-7}$  B25 = 2.39558 × 10$^{-7}$    F2 = 41.60

-continued

| | | |
|---|---|---|
| C1 = 7.64897 × 10$^{-11}$ | C25 = 8.11397 × 10$^{-11}$ | F3 = 3981.0 |
| D1 = 2.13504 × 10$^{-12}$ | D25 = 0.0 | fa = −52.82 |
| E1 = −6.28786 × 10$^{-16}$ | E25 = 0.0 | fb = 1343.3 |
| H°1 = 3.0 | H°25 = 0.0 | |

NUMERICAL EXAMPLE 3

F = 29–68 (mm) FNO = 1:2.8–3.5 2ω = 73.4°–35.2°

| | | | |
|---|---|---|---|
| R1 = 44.992 | D1 = 2.00 | N1 = 1.72000 | ν1 = 50.2 |
| R2 = 24.600 | D2 = 8.08 | | |
| R3 = 69.724 | D3 = 1.80 | N2 = 1.88300 | ν2 = 40.8 |
| R4 = 39.500 | D4 = 5.84 | | |
| R5 = −242.989 | D5 = 3.60 | N3 = 1.72342 | ν3 = 38.0 |
| R6 = −59.695 | D6 = 0.27 | | |
| R7 = −90.832 | D7 = 1.44 | N4 = 1.88300 | ν4 = 40.8 |
| R8 = 96.856 | D8 = 2.47 | | |
| R9 = 47.004 | D9 = 3.58 | N5 = 1.84666 | ν5 = 23.9 |
| R10 = 126.794 | D10 = 0.77 (Variable) | | |
| R11 = 72.077 | D11 = 2.11 | N6 = 1.48749 | ν6 = 70.2 |
| R12 = 83.756 | D12 = Variable | | |
| R13 = 63.518 | D13 = 3.12 | N7 = 1.69680 | ν7 = 55.5 |
| R14 = 622.310 | D14 = 0.15 | | |
| R15 = 34.602 | D15 = 4.10 | N8 = 1.54771 | ν8 = 62.9 |
| R16 = 155.362 | D16 = 2.34 | | |
| R17 = (Stop) | D17 = 0.39 | | |
| R18 = 25.867 | D18 = 5.34 | N9 = 1.62374 | ν9 = 47.1 |
| R19 = 298.183 | D19 = 0.61 | | |
| R20 = −285.841 | D20 = 4.34 | N10 = 1.84666 | ν10 = 23.9 |
| R21 = −33.336 | D21 = 1.40 | N11 = 1.80518 | ν11 = 25.4 |
| R22 = 2149.156 | D22 = 1.51 | N12 = 1.84666 | ν12 = 23.9 |
| R23 = 18.082 | D23 = 4.37 | | |
| R24 = 79.386 | D24 = 4.05 | N13 = 1.64769 | ν13 = 33.8 |
| R25 = −54.643 | D25 = Variable | | |
| R26 = (Movable Stop) | | | |

| f | 29.0 | 50.0 | 68.0 |
|---|---|---|---|
| D12 | 44.67 | 12.37 | 0.56 |
| D25 | 1.04 | 10.43 | 13.65 |

Aspherical Coefficients

| | | |
|---|---|---|
| A1 = 0.0 | A25 = 0.0 | F1 = −51.14 |
| B1 = 2.72094 × 10$^{-7}$ | B25 = −3.03909 × 10$^{-8}$ | F2 = 41.97 |
| C1 = 1.10896 × 10$^{-9}$ | C25 = −4.26375 × 10$^{-9}$ | fa = −49.82 |
| D1 = −4.08055 × 10$^{-13}$ | D25 = 0.0 | fb = 1001.2 |
| E1 = 3.20951 × 10$^{-15}$ | E25 = 0.0 | |
| H°1 = 3.0 | H°25 = 0.0 | |

What is claimed is:

1. A zoom lens having a first lens group of negative refractive power and a lens group following said first lens group, an axial separation between said first lens group and said following lens group being varied to effect zooming, wherein said first lens group comprises a lens unit of negative refractive power followed by another lens unit of positive refractive power, whereby, for focusing purposes, said negative lens unit is made to move axially, while said positive lens unit is held stationary during focusing to thereby correct deterioration of aberrations with focusing, and wherein the zoom lens satisfies the following condition:

$$0.01 < |F1/fb| < 0.2$$

where F1 is the focal length of said first lens group and fb is the focal length of said positive lens unit.

2. A zoom lens according to claim 1 wherein said positive lens unit consists of one positive lens.

3. A zoom lens according to claim 2, wherein said positive lens has a positive meniscus form convex toward the front.

4. A zoom lens according to claim 1, wherein said negative lens unit includes a plurality of lenses and the rearmost lens of said plurality of lenses of said negative lens unit is a positive meniscus lens convex toward the front.

5. A zoom lens according to claim 1, wherein said lens group that follows said first lens group has a positive refractive power.

6. A zoom lens comprising:
   a first lens group axially movable for zooming, having a negative refractive power and comprising, from front to rear, a negative lens unit and a positive lens unit; and
   a second lens group axially movable for zooming at the same time that said first lens group moves, having a positive refractive power, and arranged rearwardly of said first lens group,
   whereby for focusing purposes, said negative lens unit is moved so as to vary the separation with said positive lens unit.

7. A zoom lens according to claim 6, wherein said negative lens unit includes at least two negative lenses.

8. A zoom lens according to claim 7, wherein said negative lenses include two negative meniscus lenses.

9. A zoom lens according to claim 6, wherein said positive lens unit comprises a positive lens.

10. A zoom lens according to claim 9, wherein said positive lens is a meniscus lens convex toward the front.

11. A zoom lens according to claim 6, wherein said negative lens unit includes a positive lens at the rearmost place, and said positive lens unit includes another positive lens adjacent to said positive lens in said negative lens unit.

12. A zoom lens according to claim 11, wherein said positive lenses each turn its convex surface toward the front.

13. A zoom lens according to claim 12, positive lenses each are a meniscus lens.

14. A zoom lens according to claim 11, wherein the lens surface just in front of said positive lens of said negative lens unit is concave toward the rear.

* * * * *